US011091605B2

(12) United States Patent
Hewel

(10) Patent No.: US 11,091,605 B2
(45) Date of Patent: Aug. 17, 2021

(54) POLYAMIDE MOULDING COMPOSITION, IN PARTICULAR FOR THE PRODUCTION OF MOULDINGS IN THE DRINKING WATER SECTOR

(71) Applicant: EMS-PATENT AG, Domat/Ems (CH)

(72) Inventor: Manfred Hewel, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 232 days.

(21) Appl. No.: 16/104,340

(22) Filed: Aug. 17, 2018

(65) Prior Publication Data

US 2018/0355151 A1 Dec. 13, 2018

Related U.S. Application Data

(63) Continuation of application No. 14/675,953, filed on Apr. 1, 2015, now abandoned.

(30) Foreign Application Priority Data

Apr. 1, 2014 (EP) .................................... 14162997

(51) Int. Cl.
| | |
|---|---|
| C08K 7/14 | (2006.01) |
| C08K 3/04 | (2006.01) |
| C08K 5/134 | (2006.01) |
| C08G 69/26 | (2006.01) |
| C08L 77/06 | (2006.01) |
| C08K 5/00 | (2006.01) |
| A47J 31/36 | (2006.01) |
| B65D 85/804 | (2006.01) |

(52) U.S. Cl.
CPC ............ C08K 7/14 (2013.01); A47J 31/3633 (2013.01); B65D 85/8043 (2013.01); C08G 69/265 (2013.01); C08K 3/04 (2013.01); C08K 5/1345 (2013.01); C08L 77/06 (2013.01); Y10T 428/1372 (2015.01)

(58) Field of Classification Search
CPC ............ C08J 2377/10; B65D 85/8043; B29C 45/005; B29C 49/04; B32B 27/34; B32B 2262/101; B32B 2264/101; B32B 2439/00; Y10T 428/1372; Y10T 428/1352; Y10T 428/249946; Y10T 428/41725; Y10T 428/31739; B29K 2077/00; B29K 2105/16; B29K 2309/08; B29K 2507/04; B29K 2509/08; B29K 2677/00; C08L 77/06; C08L 77/02; C08L 77/00; C08L 77/10; C08L 2201/08; C08G 69/265; C08G 69/14; C08G 69/32; C08G 69/605; C08K 7/14; C08K 5/005; C08K 5/3456; C08K 5/17; C08K 5/5393; C08K 5/20; C08K 3/04; C08K 3/014; C08K 7/28; C08K 2201/003; C08K 2201/001; C08K 2201/004

USPC ............ 428/36.4, 36.9, 299.4, 474.4, 475.5; 525/418, 419, 420, 432
See application file for complete search history.

(56) References Cited

U.S. PATENT DOCUMENTS

| | | |
|---|---|---|
| RE34,447 E | 11/1993 | Poppe et al. |
| 2003/0050376 A1 | 3/2003 | Oka et al. |
| 2014/0066560 A1 | 3/2014 | Stoppelmann et al. |
| 2014/0147682 A1 | 5/2014 | Takano et al. |
| 2014/0228489 A1 | 8/2014 | Nakai et al. |

FOREIGN PATENT DOCUMENTS

| | | |
|---|---|---|
| EP | 0 827 976 A2 | 3/1998 |
| EP | 1 988 113 A1 | 11/2008 |
| EP | 2 650 331 A1 | 10/2013 |
| EP | 2706092 A1 | 3/2014 |
| JP | 63-161021 A | 7/1988 |
| WO | 2008/022910 A1 | 2/2008 |
| WO | 2009/055948 A1 | 5/2009 |
| WO | 2013/026779 A1 | 2/2013 |

OTHER PUBLICATIONS

European Search Report of EP 14 16 2997, dated May 16, 2014.
Commission Regulation (EU) No. 10/2011 of Jan. 14, 2011.

*Primary Examiner* — Camie S Thompson
(74) *Attorney, Agent, or Firm* — Sughrue Mion, PLLC

(57) ABSTRACT

A polyamide moulding composition in particular for use for components in the drinking water sector, made of the following constituents:
(A) from 25 to 74.9% by weight of at least one semicrystalline, semiaromatic nylon-6,T/6,I, composed of: (a1) from 65 to 82 mol % of terephthalic acid, based on the entirety of the dicarboxylic acids used; (a2) from 18 to 35 mol % of isophthalic acid, based on the entirety of the dicarboxylic acids used; (a3) 1,6-diaminohexane; (a4) at least one monobasic carboxylic acid; (a5) a phosphorus compound; with the first proviso that the molar ratio of the component (a3) to the entirety of the dicarboxylic acids used ((al)+(a2)) is at least 1.04 and at most 1.15; and with the second proviso that the molar ratio of the component (a4) to the component (a3) is in the range from 0.01 to 0.08;
(B) from 25 to 60% by weight of fibrous reinforcing materials;
(C) from 0 to 30% by weight of particulate fillers;
(D) from 0.1 to 2.0% by weight of heat stabilizers, with the proviso that no copper-containing stabilizers are present therein;
(E) from 0 to 2% by weight of carbon black;
(F) from 0 to 4% by weight of auxiliaries and/or additives differing from C, D and E; where the entirety of the components (A)-(F) makes up 100% by weight.

49 Claims, No Drawings

POLYAMIDE MOULDING COMPOSITION, IN PARTICULAR FOR THE PRODUCTION OF MOULDINGS IN THE DRINKING WATER SECTOR

This is a Rule 53(b) Continuation Application of U.S. application Ser. No. 14/675,953 filed Apr. 1, 2015, claiming priority based on European Patent Application No. 14 162 997.2 filed Apr. 1, 2014, the contents of all of which are incorporated herein by reference in their entirety.

TECHNICAL FIELD

The present invention relates to a polyamide moulding composition, in particular for use in the drinking water sector, i.e. for the production of mouldings with improved performance in the long-term failure test under internal hydrostatic pressure at temperatures above room temperature, and where the processed moulding composition comes into contact with drinking water during correct use.

PRIOR ART

Semicrystalline semiaromatic polyamides or copolyamides were developed for use in high-temperature environments and, in particular with a content of at least 50 mol % of semialiphatic terephthalamide units, feature particularly good thermo-mechanical properties. The melting point of polyamides of this type is typically in the range from 270 to 330° C.

Demanding applications in the sanitary sector and in particular in contact with drinking water moreover require high bursting pressure and high performance in the long-term failure test under internal hydrostatic pressure in contact with water or with water-containing fluids. This test determines the usefulness of a plastics moulding composition for a component such as a pressurized pipe by determining the long-term performance thereof under hydrostatic stress with reference to the intended operating conditions. The performance of a material is usually stated in terms of the tangential stress at which the expected lifetime of a pipe made of the plastic to be tested is 50 years at an ambient temperature of 20° C. and with use of water as test fluid. More recent developments are now aimed at providing moulding compositions that have good resistance to internal pressure either for relatively high tangential stresses or for relatively high temperatures, or sometimes for both.

Most semiaromatic polyamides comply with these requirements at temperatures in the range from room temperature up to about 50° C., but not for temperatures of 60° C. or above: by way of example the copolyamides PA 6T/66 and PA 10T/1012 have inadequate stiffness (tensile modulus of elasticity) and tensile strength at 80° C. in contact with water or with water-containing fluids, and achieve a low value of less than 100 hours in the long-term failure test under internal hydrostatic pressure at 80° C.

Materials used in drinking-water systems, which are subject to German legislation relating to materials having direct or indirect contact with the human body, are required by DIN 1988 to be such that no impermissible impairment of drinking water in terms of its suitability for human consumption is caused.

The Guideline for Hygienic Assessment of Organic Materials in Contact with Drinking Water (KTW Guideline, issued on 16.05.2007) describes inter alia a warm water test at $(60\pm2)$° C. and a hot water test at $(85\pm2)$° C. (migration test method corresponding to DIN EN 12873-1: 2004 and -2: 2005) and establishes specific migration rates for "carbon release" in contact with drinking water. It is impermissible here to exceed the guideline value of 12.5 mg $C/m^2d$ at the 7th extraction. The carbon concentration determined here, on which the migration rate is based, is the total concentration of dissolved organic carbon (total organic carbon, which can be abbreviated to TOC) after the seventh extraction cycle.

The extractable quantity of substance, and therefore the TOC value, generally rises with increasing temperature, and the same polymeric material therefore achieves different extract values at 23° C. (cold water), 60° C. (warm water) and 85° C. (hot water): Some plastics have low, KTW-compliant TOC values at room temperature but high TOC values at 60 or 85° C., and are therefore not approved for the warm water and hot water sector.

EP-A-2 650 331 describes a fibre-reinforced polyamide mixture comprising from 10 to 50% by weight of a semicrystalline polyamide, preferably of an aliphatic polyamide, from 5 to 30% by weight of an amorphous polyamide, from 30 to 65% by weight of fibrous fillers, and also optionally other additional substances. The moulding composition or the parts produced therefrom are intended to exhibit low shrinkage during processing, good surface, dimensional stability and low migration into drinking water. However, when the mixtures of the invention, based on PA66 and on amorphous PA 6I/6T (with a high proportion of 6I units), are in contact with water at 80° C., they do not have the strength or bursting pressure or performance in the long-term failure test under internal hydrostatic pressure that would lead to suitability and approval for drinking-water applications at high temperature and high pressure. The drinking-water migration values listed in accordance with the Guideline for Hygienic Assessment of Organic Materials in Contact with Drinking Water (KTW Guideline) of the German Federal Environmental Agency are, at 24.5 mg $C/m^2d$, above the limit of 12.5 mg $C/m^2d$ for the 7th extraction at 60° C. and, at 70.2 mg $C/m^2d$, above the limit of 12.5 mg $C/m^2d$ for the 7th extraction at 85° C.

WO-A-2008/022910 describes glass-fibre-reinforced polyamide moulding compositions based on polyamides with at least 50 mmol of terminal amino groups per kilogram, intended to have improved resistance to heat-ageing and to hydrolysis. Aliphatic polyamides are preferably used.

US-A-2003/0050376 describes copper-stabilized semiaromatic polyamide moulding compositions for applications in the machinery sector for automobiles with improved resistance to water and chemicals. The terminal amino group concentration of the semiaromatic polyamides is at most 15 mmol/kg.

EP-A-0 827 976 relates to polyamide moulding compositions improved in respect of thermo-oxidative resistance which inter alia comprise copper stabilizers, where the polyamides have at most 40 mmol/kg of terminal carboxy groups.

JP-A-63-161021 relates to moulding compositions with good heat-ageing resistance comprising semiaromatic polyamides with controlled adjustment of terminal groups. The difference between terminal carboxy and terminal amino groups is at least 50 mmol/kg, and the terminal carboxy groups are always predominant here.

As indicated above, the documents of the prior art disclose contradictory teachings concerning methods to improve resistance to hydrolysis and heat. Resistance is sometimes said to be better when terminal amino groups are predominant, but sometimes an excess of terminal carboxy groups is said to provide the same effect. Other documents in turn say that certain upper or lower limits are necessary for terminal amino groups and terminal carboxy groups, but these do not provide any coherent picture in the context of improvement of the stability of semiaromatic polyamides in contact with water.

DESCRIPTION OF THE INVENTION

The invention is based inter alia on the object of providing an improved moulding composition for the production of a moulding for drinking water, in particular an improved moulding composition which can also be approved for contact with high-temperature drinking water and which, when processed to give a moulding, provides values of at least 1000 h, preferably of at least 1500 h, in the long-term failure test under internal hydrostatic pressure in accordance with ISO 1167-1 and ISO 1167-2 in water at 80° C. and 45 bar. It is moreover preferable that the moulding compositions achieve the migration limits required for drinking water for hot-water applications (85° C., long-term use) and have high bursting pressure at 23° C., high strength/modulus of elasticity at 80° C., low shrinkage during processing, good surface, high dimensional stability, and low warpage. This object is achieved via a polyamide moulding composition as defined in the claims, and respectively via mouldings as defined in the claims.

Specifically, the present invention provides a polyamide moulding composition made of the following constituents:
(A) from 25 to 74.9% by weight of at least one semicrystalline, semiaromatic nylon-6,T/6,I, composed of:
(a1) from 65 to 82 mol % of terephthalic acid, based on the entirety of the dicarboxylic acids used;
(a2) from 18 to 35 mol % of isophthalic acid, based on the entirety of the dicarboxylic acids used;
(a3) 1,6-diaminohexane;
(a4) at least one monobasic carboxylic acid;
(a5) a phosphorus compound.

The individual constituents of the component (A) here are used in certain ratios. Specifically, the following provisos apply to the constituents (a1)-(a5) stated above:
first proviso: the molar ratio of the component (a3) to the entirety of the dicarboxylic acids used ((a1)+(a2)) is at least 1.04. This means that the starting materials are used during the polymerization in such a way that a substantial diamine excess is present, and it is preferable that the molar ratio of the component (a3) to the entirety of the dicarboxylic acids used ((a1)+(a2)) is at most 1.15;
second proviso: the molar ratio of the component (a4) to component (a3) is in the range from 0.01 to 0.08 (i.e. from 1 to 8 mol %). This means that there is a defined proportion of a monobasic carboxylic acid relative to the proportion of diamine.

These two provisos ensure that very specific regulation takes place during the production of the 6T/6I system, and that a very specific terminal group structure is produced, which unexpectedly is substantially responsible for achieving the particular properties according to the invention.

The polyamide moulding composition comprises the following other components:
(B) from 25 to 60% by weight of fibrous reinforcing materials (in particular glass fibres approved for contact with food);
(C) from 0 to 30% by weight of particulate fillers (different from (B), (E) and (F));
(D) from 0.1 to 2.0% by weight of heat stabilizers, with the proviso that no copper-containing stabilizers are present therein;
(E) from 0 to 2% by weight of carbon black (different from (C), (D) and (F));
(F) from 0 to 4% by weight of auxiliaries and/or additives differing from (C), (D) and (E);
where the entirety of the components (A)-(F) makes up 100% by weight.

None of the prior-art documents mentioned describes a polyamide moulding composition with the claimed constitution, let alone the suitability of this type of polyamide moulding composition for mouldings in the drinking-water sector; nor could the said suitability be rendered obvious by the uses in entirely different sectors in those documents. In particular, they give no indication to the person skilled in the art that this type of moulding composition is capable of achieving the excellent performance in the long-term failure test under internal hydrostatic pressure at relatively high temperature and the low TOC values that are required for applications of this type.

A substantial element of the invention therefore consists inter alia in the discovery that the specific mixture proposed unexpectedly actually can on the one hand provide high performance in the long-term failure test under internal hydrostatic pressure and on the other hand have a very low TOC value, while retaining very good processability with the stated levels of reinforcement (proportion of the component B).

It is preferable that the component (A) is a semiaromatic nylon-6,T/6,I composed of component (a1) from 68 to 78 mol % of terephthalic acid, preferably from 69 to 75 mol % of terephthalic acid, based on the entirety of the dicarboxylic acids used ((a1)+(a2)).

According to one preferred embodiment the molar ratio of the component (a3) to the entirety of the dicarboxylic acids used ((a1)+(a2)) is in the range from 1.045 to 1.10, preferably in the range from 1.05 to 1.08, with particular preference in the range from 1.055 to 1.075. There is therefore, as already mentioned above, a substantial diamine excess.

With component (a4), the nylon-6,T/6,I is constructed with the assistance of at least one aliphatic or cycloaliphatic or aromatic monobasic carboxylic acid, preferably an aromatic monocarboxylic acid, where the concentration of the monobasic carboxylic acid is in the range from 1 to 8 mol %, preferably from 1 to 5 mol %, or from 1.2 to 3.0 mol %, and particularly preferably in the range from 1.5 to 2.5 mol %, based on the content of diamine. Specifically, this preferably means that the molar ratio of the component (a4) to the component (a3) is in the range from 0.01 to 0.08, preferably in the range from 0.012 to 0.050 or from 0.014 to 0.030, with particular preference in the range from 0.015 to 0.025. According to another preferred embodiment of the invention the monobasic carboxylic acid is selected from the group consisting of: acetic acid, propionic acid, butyric acid, valeric acid, caproic acid, lauric acid, stearic acid, 2-ethylhexanoic acid, cyclohexanoic acid and benzoic acid and mixtures thereof.

The molar ratio of monobasic carboxylic acid to diamine excess (difference between concentration of diamine and of dicarboxylic acids) is preferably at least 0.15 or 0.20 and particularly preferably at least 0.25. Specifically, this preferably means that the proportion of the component (a4), based on the diamine excess, meaning the difference between the proportion of the component (a3) in mol and the proportion of the entirety of the diacid components (a1) and (a2) in mol, is in the range from 15 to 100 mol %, preferably in the range from 20 to 80 mol %, with particular preference in the range from 25 to 50 mol %.

The nylon-6,T/6,I is constructed with the assistance of a preferably inorganic or organic phosphorus compound, where the phosphorus content, based on the anhydrous mixture (sum of all of the input weights without water, i.e. entirety of the components (a1) to (a5)), is in the range from 40 to 400 ppm (ppm in each case based on weight), preferably from 60 to 300 ppm, and in particular in the range from 70 to 150 ppm. Preferred phosphorus compounds are phosphoric acid, phosphorous acid, hypophosphorous acid, phenylphosphonic acid, phenylphosphinic acid and/or salts thereof with mono- to trivalent cations such as Na, K, Mg, Ga, Zn or Al and/or esters thereof, for example triphenyl phosphate, triphenyl phosphite or tris(nonylphenyl) phosphite or a mixture thereof. Hypophosphorous acid and sodium hypophosphite monohydrate enjoy particular preference.

In respect of the properties relevant to subsequent processing it has also been found to be advantageous for the solution viscosity ($\eta_{rel}$) of the polyamide (A) to be from 1.4 to 1.8, with particular preference from 1.45 to 1.7, and/or for its glass transition temperature $T_g$ to be above 120° C., preferably above 125° C., with particular preference above 130° C. It has likewise been found to be advantageous for the melting point of the semicrystalline polyamide (A) to be in the range from 300 to 330° C. and for its enthalpy of fusion to be in the range from 30 to 70 J/g, in particular in the range from 40 to 65 J/g.

The polyamide moulding composition comprises, as component (B), from 25 to 60% by weight of fibrous reinforcing materials. It is preferable that the proportion of the component (B) present in the polyamide moulding composition is in the range from 30 to 60% by weight, preferably in the range from 35 to 55% by weight.

According to one preferred embodiment the fibrous reinforcing materials used in the component (B) take the form of glass fibres, preferably glass fibres approved for contact with food.

The glass fibres used can by way of example take the form of what are known as short fibres (e.g. chopped glass of length from 0.2 to 20 mm) or continuous-filament fibres (rovings). The glass fibres (B) can have various cross sections, preference being given here to glass fibres with circular cross section (round fibres) or with non-circular cross section (flat fibres).

The diameter of glass fibres with circular cross section, i.e. round glass fibres, is preferably in the range from 5 to 20 µm, more preferably in the range from 5 to 13 µm and particularly preferably in the range from 6 to 10 µm. They are preferably used in the form of short glass fibre (chopped glass of length from 0.2 to 20 mm, preferably from 2 to 12 mm).

In the case of the flat glass fibres, i.e. glass fibres with non-circular cross section, it is preferable to use those where the dimensional ratio of the primary cross-sectional axis to the secondary cross-sectional axis perpendicular thereto is more than 2.5, preferably in the range from 2.5 to 6, in particular in the range from 3 to 5. The cross section of these "flat" glass fibres is oval, elliptical, elliptical with constriction(s) ("cocoon" fibre), polygonal, rectangular or almost rectangular. Another preferred characterizing feature of the flat glass fibres used is that the length of the primary cross-sectional axis is preferably in the range from 6 to 40 µm, in particular in the range from 15 to 30 µm, and the length of the secondary cross-sectional axis is preferably in the range from 3 to 20 µm, in particular in the range from 4 to 10 µm. The flat glass fibres here have the highest possible packing density, i.e. the extent to which the cross section of the glass fills an imaginary rectangle that encloses the glass fibre cross section with the greatest possible precision is at least 70%, preferably at least 80%, and with particular preference at least 85%.

The moulding compositions of the invention can also be reinforced by using mixtures of glass fibres with circular and non-circular cross section, where the proportion of flat glass fibres is preferably predominant, i.e. makes up more than 50% by weight of the entirety of the fibres.

It is preferable that component (B) is selected from the group consisting of: E glass fibres (in accordance with ASTM D578-00 these consist of from 52 to 62% of silicon dioxide, from 12 to 16% of aluminium oxide, from 16 to 25% of calcium oxide, from 0 to 10% of borax, from 0 to 5% of magnesium oxide, from 0 to 2% of alkali metal oxides, from 0 to 1.5% of titanium dioxide and from 0 to 0.3% of iron oxide; their properties are preferably density 2.58±0.04 g/cm$^3$, tensile modulus of elasticity from 70 to 75 GPa, tensile strength from 3000 to 3500 MPa and tensile strain at break from 4.5 to 4.8%), A glass fibres (from 63 to 72% of silicon dioxide, from 6 to 10% of calcium oxide, from 14 to 16% of sodium oxide and potassium oxide, from 0 to 6% of aluminium oxide, from 0 to 6% of boron oxide, from 0 to 4% of magnesium oxide), C glass fibres (from 64 to 68% of silicon dioxide, from 11 to 15% of calcium oxide, from 7 to 10% of sodium oxide and potassium oxide, from 3 to 5% of aluminium oxide, from 4 to 6% of boron oxide, from 2 to 4% of magnesium oxide), D glass fibres (from 72 to 75% of silicon dioxide, from 0 to 1% of calcium oxide, from 0 to 4% of sodium oxide and potassium oxide, from 0 to 1% of aluminium oxide, from 21 to 24% of boron oxide), basalt fibres (mineral fibre with the approximate composition: 52% of $SiO_2$, 17% of $Al_2O_3$, 9% of CaO, 5% of MgO, 5% of $Na_2O$, 5% of iron oxide, and also other metal oxides), AR glass fibres (from 55 to 75% of silicon dioxide, from 1 to 10% of calcium oxide, from 11 to 21% of sodium oxide and potassium oxide, from 0 to 5% of aluminium oxide, from 0 to 8% of boron oxide, from 0 to 12% of titanium dioxide, from 1 to 18% of zirconium oxide, from 0 to 5% of iron oxide), and mixtures thereof.

A preferred embodiment of the component (B) is provided by high-strength glass fibres based on the ternary system silicon dioxide-aluminium oxide-magnesium oxide or on the quaternary system silicon dioxide-aluminium oxide-magnesium oxide-calcium oxide, where the sum of the contents of silicon dioxide, aluminium oxide and magnesium oxide is at least 78% by weight, preferably at least 87% by weight and particularly preferably at least 92% by weight, based on the entire composition of the glass.

It is specifically preferable to use a composition of from 58 to 70% by weight of silicon dioxide ($SiO_2$), from 15 to 30% by weight of aluminium oxide ($Al_2O_3$), from 5 to 15% by weight of magnesium oxide (MgO), from 0 to 10% by weight of calcium oxide (CaO) and from 0 to 2% by weight of other oxides, e.g. zirconium dioxide ($ZrO_2$), boron oxide ($B_2O_3$), titanium dioxide ($TiO_2$) or lithium oxide ($Li_2O$). In another embodiment the composition of the high-strength glass fibre is from 60 to 67% by weight of silicon dioxide ($SiO_2$), from 20 to 28% by weight of aluminium oxide ($Al_2O_3$), from 7 to 12% by weight of magnesium oxide (MgO), from 0 to 9% by weight of calcium oxide (CaO) and from 0 to 1.5% by weight of other oxides, e.g. zirconium dioxide ($ZrO_2$), boron oxide ($B_2O_3$), titanium dioxide ($TiO_2$), lithium oxide ($Li_2O$).

In particular it is preferable that the composition of the high-strength glass fibre is as follows: from 62 to 66% by weight of silicon dioxide ($SiO_2$), from 22 to 27% by weight of aluminium oxide ($Al_2O_3$), from 8 to 12% by weight of magnesium oxide (MgO), from 0 to 5% by weight of calcium oxide (CaO), from 0 to 1% by weight of other oxides, e.g. zirconium dioxide ($ZrO_2$), boron oxide ($B_2O_3$), titanium dioxide ($TiO_2$), lithium oxide ($Li_2O$).

The properties of the high-strength glass fibre are preferably tensile strength greater than or equal to 3700 MPa, preferably at least 3800 or 4000 MPa, tensile strain at break at least 4.8%, preferably at least 4.9 or 5.0%, and tensile modulus of elasticity greater than 75 GPa, preferably more than 78 or 80 GPa, where these properties of the glass are to be determined on individual fibres (pristine single filament) of diameter 10 µm and length 12.7 mm at a temperature of 23° C. and relative humidity 50%. Specific examples of these high-strength glass fibres of component (B1) are S glass fibres from Owens Corning with 995 size, T glass fibres from Nittobo, HiPertex from 3B, HS4 glass fibres from Sinoma Jinjing Fiberglass, R glass fibres from Vetrotex, and also S-1 and S-2 glass fibres from AGY.

The glass fibres used according to the invention by way of example as roving (continuous-filament fibres) preferably have a diameter (in the case of round glass fibres) or a secondary cross-sectional axis (in the case of flat glass fibres) of from 8 to 20 µm, preferably from 12 to 18 µm, where the cross section of the glass fibres can be round, oval, elliptical, elliptical with constriction(s), polygonal, rectangular or almost rectangular. Particular preference is given to what are known as flat glass fibres where the ratio of the cross-sectional axes, i.e. the ratio of primary cross-sectional axis to secondary cross-sectional axis, is from 2.5 to 5. The continuous-filament fibres can have been produced from the types of glass described above, preference being given here to continuous-filament fibres based on E glass and on the high-strength types of glass. These continuous-filament fibres are incorporated into the polyamide moulding compositions of the invention by known processes for the production of elongate long-fibre-reinforced pellets, in particular by pultrusion processes in which the continuous-filament fibre strand (roving) is completely saturated by the polymer melt and then cooled and chopped. The elongate long-fibre-reinforced pellets thus obtained, preferably with pellet length of from 3 to 25 mm, in particular from 4 to 12 mm, can be further processed by the usual processing methods (e.g. injection moulding, compression) to give mouldings.

Preference is given, as component (B), to glass fibres made of E glass with non-circular cross section (flat fibres) and with a ratio of primary cross-sectional axis to secondary cross-sectional axis of at least 2.5, and/or high-strength glass fibres with circular or non-circular cross section where the composition of the glass is in essence based on the components silicon dioxide, aluminium oxide and magnesium oxide, where the proportion of magnesium oxide (MgO) is from 5 to 15% by weight and the proportion of calcium oxide is from 0 to 10% by weight.

The properties of the glass fibres of the component (B) in the form of flat E glass fibres are preferably density from 2.54 to 2.62 g/cm$^3$, tensile modulus of elasticity from 70 to 75 GPa, tensile strength from 3000 to 3500 MPa and tensile strain at break from 4.5 to 4.8%, where the mechanical properties were determined on individual fibres of diameter 10 µm and length 12.7 mm at 23° C. with relative humidity 50%.

The glass fibres of the invention can have been provided with a size which comprises a coupling agent based on an amino- or epoxysilane compound and which is suitable for thermoplastics, in particular for polyamide.

Preference is given to glass fibres which will continue to have approval for contact with food or drinking water. In this context reference may be made to Regulation EU 10/2011 relating to approval for contact with food and to Recommendation 520 of the German Federal Institute for Risk Assessment (BfR) for contact with drinking water. Particular preference is given to glass fibres where the total quantity of processing aids (in particular size), based on the surface area of the glass fibres, does not exceed a value of 0.25 g/m$^2$ and/or the processing aids are preferably exclusively selected from the positive lists in Regulation EU 10/2011 (Article 22(4) in conjunction with the list according to Annex I, the list in the said Annex I being expressly included in the disclosure of this Application) and from the BfR Recommendation 520 of 1.1.2012 (relating to additional substances for fillers).

According to another preferred embodiment, the moulding compositions can comprise other fillers as component (C). It is preferable that the proportion of the component (C) present in the polyamide moulding composition is in the range of at most 20% by weight, preferably in the range of at most 10% by weight, with particular preference in the range from 0.1 to 5% by weight.

Preferred particulate fillers are in particular fillers with spheroidal and/or ellipsoidal particles. Preference is in particular given to particles made of silicate, of metal, of metal oxide, of glass, of mineral substance, of dye, and of pigment, and also mixtures of these particles. Particular preference is given to white pigments and plastics particles and mixtures of the abovementioned particles.

It is preferable that the particulate components (C) are fillers, optionally in surface-treated form, selected from the group consisting of: talc, mica, silicate, quartz, quartz powder, titanium dioxide, wollastonite, kaolin, silicas, in particular amorphous silicas, ground or precipitated calcium carbonate or magnesium carbonate, magnesium hydroxide, chalk, lime, feldspar, mica, barium sulphate, barium titanate, zinc sulphide, glass beads, in particular solid or hollow glass beads, ground glass, in particular ground glass fibres, glass flakes, permanently magnetic or magnetizable metal compounds and/or alloys, inorganic pigments, for example in particular iron oxide, iron manganese oxide, metal powders (e.g. iron powder, copper powder, aluminium powder), metal flakes (e.g. aluminium flakes, iron flakes), metal-coated fillers, metal oxides, in particular spinels, for example in particular copper iron spinel, copper chromium oxide, copper chromite ($CuCr_2O_4$), zinc iron oxide, cobalt chromium oxide, cobalt aluminium oxide, magnesium aluminium oxide, copper chromium manganese mixed oxides, copper manganese iron mixed oxides, nickel antimony titanate, chromium antimony titanate, hard or soft magnetic metals or alloys and, respectively, ceramics, hollow-bead silicate fillers, aluminium oxide, boron nitride, boron carbide, aluminium nitride, calcium fluoride, and also mixtures and/or surface-treated forms of the members of this group. Particular preference is given, as filler, to glass microbeads with average diameter in the range from 5 to 100 µm, since these tend to give the moulding isotropic properties and thus permit the production of mouldings with low warpage.

The thermoplastic moulding compositions of the invention can therefore preferably also comprise, in combination with reinforcing materials, a particulate filler or a mixture of two or more different fillers.

The proposed polyamide moulding composition also comprises, as component (D), from 0.1 to 2.0% by weight of heat stabilizers. The proportion of the component (D) present in the polyamide moulding composition is preferably in the range from 0.1 to 1.5% by weight, with particular preference in the range from 0.2 to 1.0% by weight.

According to another preferred embodiment the heat stabilizers of the component (D) are selected from the group of the phenol-based heat stabilizers, phosphite-based heat stabilizers, amine-based heat stabilizers and mixtures and combinations thereof, wherewith particular preference component (D) is selected from the following group: triethylene glycol bis(3-tert-butyl-4-hydroxy-5-methylphenyl)propionate, pentaerythritol tetrakis(3-(3,5-di-tert-butyl-4-hydroxyphenyl)propionate), N,N'-hexamethylenebis[3-(3,5-di-tert-butyl-4-hydroxyphenyl)propionamide], tris(2,4-di-tert-butylphenyl) phosphite and mixtures thereof.

Since every organic stabilizer system represents a possible carbon source in respect of the TOC requirement according to the KTW Guideline, relatively high concentrations of stabilizers should be avoided. Preference is therefore given to compliance with a maximal concentration of the stabilizing additives (component D) of 0.5% by weight, based on the polyamide matrix. In order, therefore, to ensure that no other undesired sources of carbon are present in the polyamide moulding composition, it has been found to be advantageous for the proportion of component (D) to be minimized, by way of example in that the polyamide moulding composition comprises at most 0.5 percent by weight of component (D). Preferred stabilizers are phenol compounds and/or phosphite compounds, e.g. Irganox 245, Irganox 1010, Irganox 1098, Hostanox PAR 24 or Irgafos 168. Particular preference is given to Irganox 1010 at a concentration that is less than or equal to 0.5% by weight. The proposed polyamide moulding composition can also comprise, as component (E), a proportion of no more than 2% by weight of carbon black as colorant. According to one preferred embodiment the proportion of the component (E) in the moulding composition is in the range from 0.1 to 1.5% by weight, preferably in the range from 0.4 to 1.0% by weight.

Another preferred embodiment is characterized in that the carbon black of the component (E) is carbon black approved for contact with food or for the colouring of food, with particular preference as prescribed for FDA approval (Federal Register Final Rule—69FR 44927 Jul. 28, 2004: Listing of Color Additives Subject to Certification; D & C Black No. 2). This means that the carbon black is preferably particulate carbon black with surface area in the range from 200 to 260 $m^2/g$ (nitrogen BET (Brunauer, Emmett, Teller)), and/or total arsenic content of no more than 3 mg/kg, and/or total lead content of no more than 10 mg/kg, and/or total mercury content of no more than 1 mg/kg, and/or total sulphur content of no more than 0.65%, and/or total content of polycyclic aromatic hydrocarbon (PAH) of no more than 0.5 mg/kg, and/or total content of benzo[e]pyrene of no more than 0.005 mg/kg, and/or total content of dibenz[a,h]anthracene of no more than 0.005 mg/kg, preference being given here to simultaneous compliance with all of these conditions.

The proposed polyamide moulding composition can also comprise content of up to 4% by weight of auxiliaries and/or additives in the form of the component (F). It is preferable that the proportion of the component (F) in the moulding composition is in the range from 0.1 to 3% by weight, with preference in the range from 0.2 to 2% by weight.

One preferred embodiment of the proposed polyamide moulding composition is characterized in that the auxiliaries and/or additives of the component (F) are selected from the following group: aliphatic polyamides, crystallization accelerators and crystallization retarders, flow aids, lubricants, mould-release agents, pigments, dyes and marking substances, processing aids, antistatic agents, residues from polymerization processes, for example catalysts, salts and derivatives thereof.

It is preferable that the component (F) is free from semiaromatic polyamides, in particular from amorphous semiaromatic polyamides. In particular it is preferable to exclude the presence of amorphous nylon-6,I/6,T (molar proportion of T<52 mol %) in the polyamide moulding composition.

The definition of the additives by way of example also includes carrier substances for the carbon black of the component (E), permitting problem-free introduction of the carbon black in the form of a masterbatch into the production process. This type of carrier substance is preferably an aliphatic polyamide, for example nylon-6,6.

As already explained at an earlier stage above, the proposed polyamide moulding composition is in particular characterized in that the polyamide moulding composition processed to give a moulding, preferably via injection moulding, extrusion or blow moulding, is suitable for the storage or conveying of drinking water at elevated temperature, preferably at temperatures around, at or above 60° C.±2° C. A specific feature of the said moulding composition is therefore that the total concentration of dissolved organic carbon at the seventh extraction does not exceed a migration rate value of 12.5 mg $C/m^2d$, determined by the method described in the introduction. Another preferred embodiment of the proposed polyamide moulding composition is therefore specifically characterized in that the polyamide moulding composition processed to give a moulding is designed and suitable for the storage or conveying of drinking water at temperatures at above 80° C., preferably at temperatures at, around or above 85° C.±2° C., where the total concentration of dissolved organic carbon at the seventh extraction here with particular preference does not exceed a migration rate value of 12.5 mg $C/m^2d$.

The thermoplastic moulding compositions of the invention feature good performance in the long-term failure test under internal hydrostatic pressure at high temperatures and high internal pressures, dimensional stability and stability during processing, and also suitability for drinking water. These mouldings are therefore suitable for the production of mouldings of any type via injection moulding, extrusion or blow moulding for applications in contact with warm water or with warm water-containing fluids, or in contact with food, or drinking-water applications, in particular hot-water applications, such as water meters, water meter housings, sanitary components, pipes, lines, pipe connectors, fittings, e.g. for drinking-water use, valves, domestic devices, water heaters, rice cookers, steam cookers, steam irons, and parts for tea and coffee machines. The moulding compositions are also suitable for the production of mouldings in contact with warm water in water-supply systems, e.g. warm-water tanks, and in heating and cooling systems. Among the heating systems, particular mention may be made of oil-, gas-, and wood-burning heating systems and solar heating systems, and also heat pumps and space-heating systems; among the cooling systems particular mention may be made of systems in automobile construction, e.g. cooling-water pumps.

According to another preferred embodiment, the polyamide moulding composition described above can therefore, if appropriately formulated, processed to give a moulding, preferably via injection moulding, extrusion or blow moulding, be designed for the storage or conveying of drinking water at temperatures at, around or above 80° C., preferably at temperatures at, around or above 85° C.±2° C. A feature of the said moulding composition is therefore specifically that the total concentration of dissolved organic carbon at the seventh extraction does not exceed a value of 12.5 mg C/m²d.

Accordingly, the present invention also provides a moulding for conveying and/or storage of drinking water in particular at elevated temperatures preferably in the region of and above 80° C. The moulding here can in particular assume the three-dimensional form of the following structural elements: pipes, fitting, housing, mixer, tap, filter casing, water meter, water meter component (bearings, propellers, pins), valve, valve component (housing, shut-off ball, slide, cylinder), distributor, household device, water heater, rice cooker, steam cooker, steam iron, cartridge, pump, pump component (e.g. turbine wheels, impellors), line or container or constituent or element thereof, produced with use of a moulding composition as described above. It is preferable that at least one region, for example in the form of a coating or of a section of the component, has substantially direct exposure to the drinking water during correct use.

The present invention further provides a use of a polyamide moulding composition as described above for the production of a moulding, in particular of a component for conveying and/or storage of drinking water, in particular at elevated temperatures preferably in the region of or above 80° C., in particular a fitting, housing, filter casing, tap, distributor, valve, valve component, cartridge, pump, pump component, line or container or respectively a constituent or element thereof.

The dependent claims provide further embodiments.

DESCRIPTION OF PREFERRED EMBODIMENTS

Preferred embodiments of the invention are described below with reference to the Inventive Examples, which serve merely for illustration and are not to be interpreted as restrictive.

Description of the production process:

The polyamide moulding compositions according to the Inventive Examples are produced by the process described in EP 1 988 113 A1. In particular, reference is made here to the process as described in EP-A 1 988 113 in paragraphs [0038] and [0113]-[0120], and these passages are expressly incorporated into the disclosure of this Application in respect of production processes. Monomers, catalyst and regulator are charged to the system, and a precondensate is produced. The dried precondensate is post-condensed in the extruder, mixed with glass fibres and additives, and pelletized. The pellets are used to produce test samples and properties are tested.

Materials Used:

Irganox 1010: Pentaerythritol tetrakis [3-(3,5-di-tert-butyl-4-hydroxyphenyl)propionate], antioxidant based on a sterically hindered phenol, obtainable from Ciba Specialty Chemicals, Inc.

Glass fibres: Type A: Vetrotex 995 EC10-4.5: E glass, diameter 10 μm (round cross section), length 4.5 mm, obtainable from Saint-Gobain Vetrotex, France; Type B: CPIC ECS 301HP: E glass, diameter 10 μm (round cross section), length 3 mm, with silane size, complying with future requirements for contact with food and drinking water, obtainable from Chongqing Polycomp International Corp. (CPIC)

Carbon black: Black Pearls 4750, high-purity carbon black for contact with food, BET surface area 260 g/m², Cabot (25% by weight in the form of masterbatch MB dispersed in PA66)

Phosphinic acid: 50% $H_3PO_2$ (CAS No. 6303-21-5), obtainable from FEBEX SA

Tafmer MC-201: Impact-modifier mixture made of maleic-anhydride-grafted ethylene-propylene and ethylene-butylene copolymers, obtainable from Mitsui.

The test samples were produced in an Arburg Allrounder injection-moulding machine with the cylinder temperatures set at from 250° C. to 350° C. and with peripheral screw velocity of 15 m/min. The selected mould temperature was from 120 to 160° C.

The measurements were made in accordance with the following standards and on the following test samples.

Tensile modulus of elasticity: ISO 527 with tensile velocity 1 mm/min, ISO tensile specimen, standard: ISO/CD 3167, type A1, 170×20/10×4 mm, temperature 23° C.

Breaking strength, tensile strain at break and fracture energy: ISO 527 with tensile velocity 5 mm/min. ISO tensile specimen, standard: ISO/CD 3167, type A1, 170×20/10×4 mm, temperature 23° C. or 80° C.

Relative viscosity: DIN EN ISO 307, in 0.5% by weight m-cresol solution, temperature 20° C.

Bursting pressure: A cylindrical, single-side-sealed injection moulding (internal diameter 31.6 mm; wall thickness: 2 mm) is filled with water, mounted in a bursting pressure test rig by means of a rapid-action hydraulic coupling, and subjected to a bursting pressure test (internal pressurization until failure occurs) using a pressure rise of 10 bar/s at 23° C. The tables state the maximal pressure reached (average value across 10 samples). The test samples were subjected in advance to storage in water (336 hours, 95° C.), and immediately after this were passed on to the bursting pressure test, while wet.

Water absorption: ISO tensile specimens are stored for a period of 336 hours in water at a temperature of 95° C. After drying of the surface with a cotton cloth, the percentage weight increase based on initial weight (dry ISO tensile specimen) is determined.

TOC value measurement: $7^{th}$ migration: In accordance with the Guideline for Hygienic Assessment of Organic Materials in Contact with Drinking Water (KTW Guideline, issued on 16.05.2007); hot water test at (85±2)° C. (migration test method corresponding to DIN EN 12873-1: 2004 and -2: 2005); in each case two identical contact tests and blind tests were carried out in parallel; the difference between the average values relating to measured value and blind value gives the required carbon concentration; test samples used were sheets with surface area 87.5 cm², each extracted with 350 ml of test water per migration test; TOC was determined by the NPOC method with TOC-V CPH equipment from Shimadzu.

Long-term failure test under internal hydrostatic pressure: On the basis of ISO 1167-1 and 1167-2, the time for which the injection-moulded test samples with free length $l_0$ 180 mm, external diameter $d_n$ 50 mm and wall thickness 3.7 mm withstand a temperature of 80° C. at a hydrostatic pressure of 45 bar. The test samples here were sealed with a type A end cap, and the test arrangement used was "water inside, air outside". The stated time is the average value from 3 individual determinations. The test samples were stored in water at 80° C. for 28 days before measurement.

TABLE 1

Constitution of the main nylon-6, T/6, I, of the moulding composition, and properties thereof for Inventive Examples IE1-IE4.

| Property | Unit | IE1 | IE2 | IE3 | IE4 |
|---|---|---|---|---|---|
| Polyamide | type | 6, T/6, I | 6, T/6, I | 6, T/6, I | 6, T/6, I |
| TPA/IPA | mol % | 70/30 | 70/30 | 75/25 | 80/20 |
| 1,6-Hexanediamine | g | 3803 | 3803 | 3802 | 3802 |
| Terephthalic acid | g | 3590 | 3590 | 3846 | 4102 |
| Isophthalic acid | g | 1539 | 1539 | 1282 | 1026 |
| Phosphinic acid, 50% | g | 3.07 | 3.07 | 3.08 | 3.08 |
| Benzoic acid | g | 65.70 | 65.70 | 65.72 | 65.72 |
| Water | g | 3000 | 3000 | 3001 | 3001 |
| 1,6-Hexanediamine | mol | 32.72 | 32.72 | 32.72 | 32.72 |
| Terephthalic acid | mol | 21.61 | 21.61 | 23.15 | 24.69 |
| Isophthalic acid | mol | 9.26 | 9.26 | 7.72 | 6.17 |
| Benzoic acid | mol | 0.54 | 0.54 | 0.54 | 0.54 |
| Mol of diamine | mol | 32.72 | 32.72 | 32.72 | 32.72 |
| Mol of diacid | mol | 30.87 | 30.87 | 30.87 | 30.87 |
| Diamine/diacid | molar ratio | 1.060 | 1.060 | 1.060 | 1.060 |
| Mol (benzoic acid)/ mol (diamine) X | mol % | 1.64 | 1.64 | 1.64 | 1.64 |
| Phosphorus/ total (monomers) | ppm | 81 | 81 | 81 | 81 |
| Polyamide | % by wt. | 58.5 | 48.55 | 58.5 | 58.5 |
| Irganox1010 | % by wt. | 0.3 | 0.25 | 0.3 | 0.3 |
| Glass fibre type B | % by wt. | 40 | 50 | 40 | 40 |
| Carbon black MB | % by wt. | 1.2 | 1.2 | 1.2 | 1.2 |
| Relative viscosity | | 1.696 | 1.688 | 1.609 | 1.644 |
| Water absorption, 336 h in H$_2$O 95° C. | % by wt. | 2.76 | 2.21 | 2.8 | 2.51 |
| Tensile modulus of elasticity, 23° C., dry | MPa | 14150 | 18010 | 13920 | 14200 |
| Breaking strength, 23° C., dry | MPa | 251 | 279 | 219 | 214 |
| Tensile strain at break, 23° C., dry | % | 2.5 | 2.4 | 2.2 | 2 |
| Fracture energy, 23° C., dry | J | 10.6 | 12 | 8.1 | 6.9 |
| Tensile modulus of elasticity, 23° C., wet | MPa | 14330 | 18280 | 14140 | 14580 |
| Breaking strength, 23° C., wet | MPa | 208 | 234 | 189 | 190 |
| Tensile strain at break, 23° C., wet | % | 3.9 | 2.2 | 2.4 | 2.1 |
| Fracture energy, 23° C., wet | J | 10 | 10 | 8.5 | 7.4 |
| Tensile modulus of elasticity, 80° C., dry | MPa | 13110 | 16330 | 12620 | 12230 |
| Breaking strength, 80° C., dry | MPa | 200 | 220 | 178 | 180 |
| Tensile strain at break, 80° C., dry | % | 2.5 | 2.4 | 2.1 | 2.1 |
| Fracture energy, 80° C., dry | J | 6 | 6.5 | 4.3 | 4.3 |
| Tensile modulus of elasticity, 80° C., wet | MPa | 6150 | 7770 | 7610 | 7810 |
| Breaking strength, 80° C., wet | MPa | 94 | 103 | 104 | 107 |
| Tensile strain at break, 80° C., wet | % | 5.7 | 4.7 | 4.6 | 4.1 |
| Fracture energy, 80° C., wet | J | 8.1 | 7.1 | 7.3 | 6.7 |
| Performance in long-term failure test under internal hydrostatic pressure, 45 bar, 80° C., H$_2$O | h | 1541 | 674 | 1850 | 1932 |
| TOC, 7$^{th}$ extraction | mg C/m$^2$d | 8.5 | 9.5 | 9.1 | 8.8 |
| Bursting pressure, dry, 23° C. | bar | 124 | n.d. | 128 | 132 |
| Bursting pressure, wet, 23° C. | bar | 117 | n.d. | 122 | 124 | n.d.: not determined

Table 2

Constitution of the main nylon-6, T/6, I, of the moulding composition, and properties thereof for Comparative Examples CE1-CE6.

| Property | Unit | CE1 | CE2 | CE3 | CE4 | CE5 | CE6 |
|---|---|---|---|---|---|---|---|
| Polyamide type | | 6, T/6, I | 6, T/6, I | 6, T/6, I | 6, T/6, I | 10, T/6, 12 | 10, T/6, T |
| Monomer ratio | mol % | 70/30 | 70/30 | 73/19/8 | 73/19/8 | 80/20 | 82/18 |
| 1,6-Hexanediamine | g | 3729 | 3729 | 3379 | 3379 | 542 | 538 |
| 1,10-Decanediamine | g | | | | | 3303 | 3685 |
| Terephthalic acid | g | 3658 | 3658 | 3716 | 3716 | 2991 | 4077 |
| Isophthalic acid | g | 1568 | 1568 | 929 | 929 | | |
| 1,12-Dodecanedioic acid | g | | | | | 1008 | |
| Caprolactam | g | | | 892 | 892 | | |
| Sodium hypophosphite | g | 2.67 | 2.67 | | | | |
| Phosphinic acid, 50% | g | | | 11.50 | 11.50 | 190.65 | 10.73 |
| Benzoic acid | g | 19.10 | 19.10 | 72.00 | 72.00 | 190.65 | 89.04 |
| Water | g | 3024 | 3024 | 3000 | 3000 | 3965 | 3600 |
| 1,6-Hexanediamine | mol | 32.08 | 32.08 | 29.08 | 29.08 | 4.67 | 4.63 |
| 1,10-Decanediamine | mol | | | | | 19.17 | 21.38 |
| Terephthalic acid | mol | 22.02 | 22.02 | 22.37 | 22.37 | 18.00 | 24.54 |
| Isophthalic acid | mol | 9.44 | 9.44 | 5.59 | 5.59 | | |
| 1,12-Dodecanedioic acid | mol | | | | | 4.38 | |
| Caprolactam | mol | | | 7.88 | 7.88 | | |
| Benzoic acid | mol | 0.16 | 0.16 | 0.59 | 0.59 | 1.56 | 0.73 |
| Mol of diamine | mol | 32.08 | 32.08 | 29.08 | 29.08 | 23.83 | 26.02 |
| Mol of diacid | mol | 31.46 | 31.46 | 27.96 | 27.96 | 22.38 | 24.54 |
| Diamine/diacid | molar ratio | 1.020 | 1.020 | 1.040 | 1.040 | 1.065 | 1.060 |
| Mol (benzoic acid)/ mol (diamine) X | mol % | 0.49 | 0.49 | 2.03 | 2.03 | 6.22 | 2.80 |

Table 2-continued

Constitution of the main nylon-6, T/6, I, of the moulding composition, and properties thereof for Comparative Examples CE1-CE6.

| Property | Unit | CE1 | CE2 | CE3 | CE4 | CE5 | CE6 |
|---|---|---|---|---|---|---|---|
| Phosphorus/total (monomers) | ppm | 87 | 87 | 303 | 303 | 0 | 304 |
| Polyamide | % by wt. | 58.5 | 48.55 | 59.7 | 52.5 | 58.5 | 58.5 |
| Tafmer MC201 | % by wt. | | | | 6 | | |
| Irganox1010 | % by wt. | 0.3 | 0.25 | 0.3 | 0.3 | 0.3 | 0.3 |
| Glass fibre type A | % by wt. | | | 40 | | | 40 |
| Glass fibre type B | % by wt. | 40 | 50 | | 40 | 40 | |
| Carbon black MB | % by wt. | 1.2 | 1.2 | | 1.2 | 1.2 | 1.2 |
| Relative viscosity | | 1.671 | 1.685 | 1.613 | 1.526 | 1.66 | 1.878 |
| Water absorption, 336 h in $H_2O$ 95° C. | % by wt. | 2.57 | 2.18 | 3.16 | 3.01 | 1.74 | 1.89 |
| Tensile modulus of elasticity, 23° C., dry | MPa | 14 220 | 17 710 | 14 044 | 13 080 | 12 750 | 12 780 |
| Breaking strength, 23° C., dry | MPa | 255 | 275 | 232 | 194 | 193 | 213 |
| Tensile strain at break, 23° C., dry | % | 2.4 | 2.2 | 2.2 | 2.4 | 2.2 | 2.7 |
| Fracture energy, 23° C., dry | J | 10 | 11 | 5.9 | 8.8 | 7.6 | 7 |
| Tensile modulus of elasticity, 23° C., wet | MPa | 14 390 | 18 180 | 12 720 | 12 170 | 11 870 | 12 138 |
| Breaking strength, 23° C., wet | MPa | 206 | 212 | 128 | 148 | 179 | 147 |
| Tensile strain at break, 23° C., wet | % | 2.1 | 1.7 | 1.5 | 2.6 | 2.5 | 1.7 |
| Fracture energy, 23° C., wet | J | 7.9 | 6.4 | 2.5 | 8.4 | 8.8 | 2.9 |
| Tensile modulus of elasticity, 80° C., dry | MPa | 12 640 | 16 120 | 11 540 | 10 840 | 7300 | 9120 |
| Breaking strength, 80° C., dry | MPa | 201 | 214 | 161 | 139 | 121 | 122 |
| Tensile strain at break, 80° C., dry | % | 2.4 | 2.1 | 2 | 2.1 | 4.3 | 3.1 |
| Fracture energy, 80° C., dry | J | 5.6 | 5.5 | 3.9 | 3.7 | 7.4 | 5.4 |
| Tensile modulus of elasticity, 80° C., wet | MPa | 6320 | 7860 | 4400 | 4020 | 4750 | 6220 |
| Breaking strength, 80° C., wet | MPa | 90 | 91 | 45 | 64 | 82 | 77 |
| Tensile strain at break, 80° C., wet | % | 4.2 | 3.3 | 1.8 | 4.9 | 4.1 | 2.6 |
| Fracture energy, 80° C., wet | J | 5.5 | 4.2 | 1.1 | 4.7 | 4.6 | 2.9 |
| Performance in long-term failure test under internal hydrostatic pressure, 45 bar, 80° C., $H_2O$ | h | 436 | 170 | 0.01 | 3.4 | 120 | n.d. |
| TOC, $7^{th}$ extraction | mg C/m²d | 9.4 | 10.7 | n.d. | n.d. | n.d. | 6.7 |
| Bursting pressure, dry, 23° C. | bar | 117 | n.d. | n.d. | 120 | 93 | n.d. |
| Bursting pressure, wet, 23° C. | bar | 100 | n.d. | n.d. | 90 | 67 | n.d. |

On the basis of the measurements it is possible especially to discern the following effects which unexpectedly distinguish the mouldings produced from the moulding compositions of the invention (IE1-IE4) substantially from the Comparative Examples (CE1-CE6) not according to the invention:

Taking the overall picture, the findings are that the mechanical properties (tensile modulus of elasticity, breaking strength, tensile strain at break, fracture energy) under conditions of increasing water absorption and/or of increasing temperature are substantially better in the case of the moulding compositions of the invention, an effect that cannot be explained via any correlation with the actual water absorption value.

However, the values for performance in the long-term failure test under internal hydrostatic pressure are very particularly prominent. As can be seen from the measurements of the moulding compositions of the invention, the corresponding values from the long-term failure test under internal hydrostatic pressure are orders of magnitude better than those for the comparative moulding compositions.

Use of a diamine excess of 1.06 and 1.64% of benzoic acid in Inventive Examples IE1 and IE2 instead of a diamine excess of 1.02 and 0.49% of benzoic acid in the Comparative Examples CE1 and CE2 raised performance in the long-term failure test under internal hydrostatic pressure from 436 h and 170 h to 1541 h and 674 h, for an identical 70/30 PA6T/6I composition. At the same time, wet breaking strength at 80° C. rises from 90 and 91 MPa to 94 and 103 MPa, and fracture energy rises from 5.5 and 4.2 to 8.1 and 7.1 J, although the mechanical properties of dry samples at room temperature are practically identical and there is almost no difference in the relative viscosities: 1.696 and 1.688 compared with 1.671 and 1.685.

The two Inventive Examples IE3 and IE4 show that the wet breaking strength at 80° C. can be increased further by changing the 6,T/6,I ratio. Performance in the long-term failure test under internal hydrostatic pressure likewise rises further. The two products IE3 and IE4 at room temperature, dry and wet, and also at 80° C. dry, are no stiffer and no stronger than TEL IE3 and IE4 have higher modulus and higher strength than IE1 only when used wet at 80° C.

When monomers which increase water absorption are used, for example caprolactam in Comparative Examples C3 and C4, wet strength at 80° C. is severely reduced. Although strength and fracture energy can be increased by using impact modifier, performance in the long-term failure test under internal hydrostatic pressure remains at the low level of 3.4 h. Use of long-chain monomers as in Comparative Examples C5 and C6 reduces water absorption very greatly, but there is a simultaneous reduction of modulus and strength, even at 23° C. Wet strength at 80° C. is inadequate for good performance in the long-term failure test under internal hydrostatic pressure.

The invention claimed is:

1. A polyamide moulding composition made of the following constituents:
   (A) from 25 to 74.9% by weight of at least one semicrystalline, semiaromatic nylon-6,T/6,I, composed of:
      (a1) from 68 to 82 mol % of terephthalic acid, based on the entirety of the dicarboxylic acids used;
      (a2) from 18 to 32 mol % of isophthalic acid, based on the entirety of the dicarboxylic acids used;
      (a3) 1,6-diaminohexane;
      (a4) at least one monobasic carboxylic acid;
      (a5) from 40 to 400 ppm of phosphorus, based on the mass of the anhydrous input weight of the entirety of the components (a1) to (a5), in the form of a phosphorus compound;
      with the first proviso that the molar ratio of the component (a3) to the entirety of the dicarboxylic acids used ((a1)+(a2)) is at least 1.04 and at most 1.10;
      and with the second proviso that the molar ratio of the component (a4) to the component (a3) is in the range from 0.01 to 0.08;
   (B) from 25 to 60% by weight of fibrous reinforcing materials;
   (C) from 0 to 30% by weight of particulate fillers;
   (D) from 0.1 to 2% by weight of heat stabilizers, with the proviso that no copper-containing stabilizers are present therein;
   (E) from 0 to 2% by weight of carbon black;
   (F) from 0 to 4% by weight of at least one of auxiliaries and additives differing from C, D and E;
   where the entirety of the components (A)-(F) makes up 100% by weight.

2. The polyamide moulding composition according to claim 1, wherein the molar ratio of the component (a3) to the entirety of the dicarboxylic acids used ((a1)+(a2)) is in the range from 1.045 to 1.10.

3. The polyamide moulding composition according to claim 1, wherein the component (A) comprises, as component (a1), from 68 to 78 mol % of terephthalic acid, based on the entirety of the dicarboxylic acids used ((a1)+(a2)).

4. The polyamide moulding composition according to claim 1, wherein the component (A) comprises, as component (a5), a phosphorus compound, where the phosphorus content of this component (a5), based on the anhydrous mixture, meaning the sum of all of the input weights for component (A) without water, is in the range from 60 to 300 ppm.

5. The polyamide moulding composition according to claim 1, wherein the monobasic carboxylic acid of the component (a4) is an aliphatic or cycloaliphatic or aromatic monocarboxylic acid and mixtures thereof.

6. The polyamide moulding composition according to claim 1, wherein the fibrous reinforcing materials of the component (B) used take the form of glass fibres.

7. The polyamide moulding composition according to claim 1, wherein the particulate fillers of the component (C) are selected as fillers, in surface-treated or surface untreated form, selected from the group consisting of: talc, mica, silicate, quartz, quartz powder, titanium dioxide, wollastonite, kaolin, silicas, ground or precipitated calcium carbonate or magnesium carbonate, magnesium hydroxide, chalk, lime, feldspar, barium sulphate, barium titanate, zinc sulphide, glass beads, ground glass, glass flakes, permanently magnetic or magnetizable metal compounds or alloys, inorganic pigments, metal powders, metal flakes, metal-coated fillers, metal oxides, hard or soft magnetic metals or alloys, ceramics, hollow-bead silicate fillers, aluminium oxide, boron nitride, boron carbide, aluminium nitride, calcium fluoride, and also mixtures of this group.

8. The polyamide moulding composition according to claim 1, wherein the heat stabilizers of the component (D) are selected from the group of the phenol-based heat stabilizers, phosphite-based heat stabilizers, amine-based heat stabilizers and mixtures and combinations thereof.

9. The polyamide moulding composition according to claim 1, wherein the carbon black of the component (E) is particulate carbon black approved for contact with food or for the colouring of food with at least one of;
   surface area in the range from 200 to 260 $m^2$/g (nitrogen BET (Brunauer, Emmett, Teller)),
   or total arsenic content of no more than 3 mg/kg,
   or total lead content of no more than 10 mg/kg,
   or total mercury content of no more than 1 mg/kg, or total sulphur content of no more than 0.65%, or total content of polycyclic aromatic hydrocarbon (PAH) of no more than 0.5 mg/kg, or total content of benzo[e]pyrene of no more than 0.005 mg/kg
   or total content of dibenz[a,h]anthracene of no more than 0.005 mg/kg
   or a combination of a plurality of these properties.

10. The polyamide moulding composition according to claim 1, wherein the at least one of auxiliaries and additives of the component (F) are selected from the following group: aliphatic polyamides, crystallization accelerators and crystallization retarders, flow aids, lubricants, mould-release agents, pigments, dyes and marking substances, processing aids, antistatic agents, and residues from polymerization processes.

11. The polyamide moulding composition according to claim 10, wherein the residues from polymerisation processes are catalysts, salts and derivatives thereof.

12. The polyamide moulding composition according to claim 1, wherein the polyamide moulding composition processed to give a molding is designed for the storage or conveying of drinking water at temperatures at, around or above 80° C.

13. A moulding, for at least one of conveying and storage of drinking water or for uses in contact with at least one of cold and warm water in water-supply systems on the basis of or produced with use of a moulding composition according to claim 1.

14. A moulding according to claim 13, wherein at least one region, in the form of a coating or of a section, has substantially direct exposure to the drinking water during correct use.

15. The moulding according to claim 13, wherein at least one region, has substantially direct exposure to the drinking water during correct use.

16. The polyamide moulding composition according to claim 1, wherein the molar ratio of the component (a3) to the entirety of the dicarboxylic acids used ((a1)+(a2)) is in the range from 1.05 to 1.08.

17. The polyamide moulding composition according to claim 1, wherein the molar ratio of the component (a3) to the entirety of the dicarboxylic acids used ((a1)+(a2)) is in the range from 1.055 to 1.075.

18. The polyamide moulding composition according to claim 1, wherein the molar ratio of the component (a4) to the component (a3) is in the range 0.012 to 0.050.

19. The polyamide moulding composition according to claim 1, wherein the molar ratio of the component (a4) to the component (a3) is in the range 0.015 to 0.025.

20. The polyamide moulding composition according to claim 1, wherein the proportion of the component (a4), based on the diamine excess, meaning the difference between the proportion of the component (a3) in mol and the proportion of the entirety of the diacid components (a1) and (a2) in mol, is in the range from 15 to 100 mol %.

21. The polyamide moulding composition according to claim 1, wherein the proportion of the component (a4), based on the diamine excess, meaning the difference between the proportion of the component (a3) in mol and the proportion of the entirety of the diacid components (a1) and (a2) in mol, is in the range from 20 to 80 mol %.

22. The polyamide moulding composition according to claim 1, wherein the proportion of the component (a4), based on the diamine excess, meaning the difference between the proportion of the component (a3) in mol and the proportion of the entirety of the diacid components (a1) and (a2) in mol, is in the range from 25 to 50 mol %.

23. The polyamide moulding composition according to claim 1, wherein the component (A) comprises, as component (a1), from 69 to 75 mol % of terephthalic acid, based on the entirety of the dicarboxylic acids used ((a1)+(a2)).

24. The polyamide moulding composition according to claim 1, wherein the component (A) comprises, as component (a5), a phosphorus compound in the form of at least one of a phosphoric acid, of a phosphorous acid, of a hypophosphorous acid, or phenylphosphonic acid, phenylphosphinic acid or salts thereof with mono- to trivalent cations or esters thereof, where the phosphorus content of this component (a5), based on the anhydrous mixture, meaning the sum of all of the input weights for component (A) without water, is in the range from 60 to 300 ppm.

25. The polyamide moulding composition according to claim 1, wherein the component (A) comprises, as component (a5), at least one of triphenyl phosphate, triphenyl phosphite or tris(nonylphenyl) phosphite or a mixture thereof, where the phosphorus content of this component (a5), based on the anhydrous mixture, meaning the sum of all of the input weights for component (A) without water, is in the range from 70 to 150 ppm.

26. The polyamide moulding composition according to claim 1, wherein the monobasic carboxylic acid of the component (a4) is an aliphatic or cycloaliphatic or aromatic monocarboxylic acid, where the monobasic carboxylic acid is selected from the group consisting of: acetic acid, propionic acid, butyric acid, valeric acid, caproic acid, lauric acid, stearic acid, 2-ethylhexanoic acid, cyclohexanoic acid and benzoic acid and mixtures thereof.

27. The polyamide moulding composition according to claim 1, wherein the fibrous reinforcing materials of the component (B) used take the form of glass fibres, approved for contact with food, where the total quantity of processing aids comprised by the glass fibres, including the size, based on the surface area of the glass fibres, does not exceed a value of 0.25 g/m$^2$, or the processing aids are exclusively selected from the positive list according to Annex I of Regulation EU 10/2011.

28. The polyamide moulding composition according to claim 1, wherein the proportion of the component (B) present in the polyamide moulding composition is in the range from 30 to 60% by weight.

29. The polyamide moulding composition according to claim 1, wherein the proportion of the component (B) present in the polyamide moulding composition is in the range from 35 to 55% by weight.

30. The polyamide moulding composition according to claim 1, wherein the particulate fillers of the component (C) are selected as fillers, selected from the group consisting of: talc, mica, silicate, quartz, quartz powder, titanium dioxide, wollastonite, kaolin, silicas in the form of amorphous silicas, ground or precipitated calcium carbonate or magnesium carbonate, magnesium hydroxide, chalk, lime, feldspar, barium sulphate, barium titanate, zinc sulphide, solid or hollow glass beads, ground glass fibres, glass flakes, permanently magnetic or magnetizable metal compounds or alloys, inorganic pigments in the form of iron oxide, iron manganese oxide, iron powder, copper powder, aluminium powder, aluminium flakes, iron flakes, metal-coated fillers, metal oxide spinels, including copper iron spinel, copper chromium oxide, copper chromite (CuCr$_2$O$_4$), zinc iron oxide, cobalt chromium oxide, cobalt aluminium oxide, magnesium aluminium oxide, copper chromium manganese mixed oxides, copper manganese iron mixed oxides, nickel antimony titanate, chromium antimony titanate, hard or soft magnetic metals or alloys, ceramics, hollow-bead silicate fillers, aluminium oxide, boron nitride, boron carbide, aluminium nitride, calcium fluoride, and also mixtures or surface-treated forms of the members of this group.

31. The polyamide moulding composition according to claim 1, wherein the proportion of the component (C) present in the polyamide moulding composition is in the range of at most 20% by weight.

32. The polyamide moulding composition according to claim 1, wherein the proportion of the component (C) present in the polyamide moulding composition is in the range of at most 10% by weight.

33. The polyamide moulding composition according to claim 1, wherein the proportion of the component (C)

present in the polyamide moulding composition is in the range from 0.1 to 5% by weight.

34. The polyamide moulding composition according to claim 1, wherein the heat stabilizers of the component (D) are selected from the following group: tri ethylene glycol bis(3-tert-butyl-4-hydroxy-5-methylphenyl)propionate, pentaerythritol tetrakis(3-(3,5-di-tert-butyl-4-hydroxyphenyl)propionate), N,N'-hexamethylenebis[3-(3,5-di-tert-butyl-4-hydroxyphenyl)propionamide], tris(2,4-di-tert-butylphenyl) phosphite and mixtures thereof.

35. The polyamide moulding composition according to claim 1, wherein the proportion of the component (D) present in the polyamide moulding composition is in the range from 0.1 to 1.5% by weight.

36. The polyamide moulding composition according to claim 1, wherein the proportion of the component (D) present in the polyamide moulding composition is in the range from 0.2 to 1.0% by weight.

37. The polyamide moulding composition according to claim 1, wherein the carbon black of the component (E) is carbon black approved for contact with food or for the colouring of food, in the form of carbon black with at least one of surface area in the range from 200 to 260 $m^2/g$ (nitrogen BET (Brunauer, Emmett, Teller)),
or total arsenic content of no more than 3 mg/kg,
or total lead content of no more than 10 mg/kg,
or total mercury content of no more than 1 mg/kg,
or total sulphur content of no more than 0.65%,
or total content of polycyclic aromatic hydrocarbon (PAH) of no more than 0.5 mg/kg,
or total content of benzo[e]pyrene of no more than 0.005 mg/kg
or total content of dibenz[a,h]anthracene of no more than 0.005 mg/kg
or a combination of a plurality of these properties.

38. The polyamide moulding composition according to claim 1, wherein the proportion of the component (E) in the moulding composition is in the range from 0.1 to 1.5% by weight.

39. The polyamide moulding composition according to claim 1, wherein the proportion of the component (E) in the moulding composition is in the range from 0.4 to 1.0% by weight.

40. The polyamide moulding composition according to claim 1, wherein the at least one of auxiliaries and additives of the component (F) are selected from the following group: aliphatic polyamides, crystallization accelerators and crystallization retarders, flow aids, lubricants, mould-release agents, pigments, dyes and marking substances, processing aids, antistatic agents, residues from polymerization processes, where the component (F) is free from semiaromatic polyamides, including amorphous semiaromatic polyamides including polyamide 6I/6 T.

41. The polyamide moulding composition according to claim 40, wherein the residues from polymerisation processes are catalysts, salts and derivatives thereof.

42. The polyamide moulding composition according to claim 1, wherein the proportion of the component (F) in the moulding composition is in the range from 0.1 to 3% by weight.

43. The polyamide moulding composition according to claim 1, wherein the proportion of the component (F) in the moulding composition is in the range from 0.2 to 2% by weight.

44. The polyamide moulding composition according to claim 1, wherein the polyamide moulding composition processed to give a moulding, via injection moulding, extrusion or blow moulding, is designed for the storage or conveying of drinking water at temperatures at, around or above 80° C.

45. The polyamide moulding composition according to claim 1, wherein the polyamide moulding composition processed to give a moulding, is designed for the storage or conveying of drinking water at temperatures at, around or above 85° C.±2° C., where the total concentration of dissolved organic carbon at the seventh extraction here with does not exceed a migration rate value of 12.5 mg $C/m^2d$.

46. A moulding, produced via injection moulding, extrusion or blow moulding, for at least one of conveying and storage of drinking water or for uses in contact with at least one of cold and warm water in water-supply systems, including warm water tanks, and in heating and cooling systems including oil-, gas-, and wood-burning and solar heating systems, and also heat pumps and space-heating systems, including those for systems in automobile construction, including cooling-water pumps, produced with use of a moulding composition according to claim 1.

47. A moulding, produced via injection moulding, extrusion or blow moulding, for at least one of conveying and storage of drinking water at elevated temperatures in the region of and above 80° C. including pipe, fitting, domestic device, water heater, rice cooker, steam cooker, steam iron, housing, mixer, tap, filter casing, water meter, water meter component including bearings, propellers, pins, valve, valve component including housing, shut-off ball, slide, cylinder, distributor, cartridge, pump, pump component, including turbine wheels, impellors, line or container or constituent or element thereof, produced with use of a moulding composition according to claim 1.

48. A method of producing a moulding, comprising
(i) melting the polyamide moulding composition of claim 1, and
(ii) conducting a moulding process selected from the group consisting of an injection moulding, an extrusion moulding, and a blow moulding using a melted composition obtained from the step (i),
wherein the moulding is in the form of a component for at least one of conveying and storage of drinking water or for uses in contact with at least one of cold and warm water in water-supply systems, including warm water tanks, and in heating and cooling systems, including oil-, gas-, and wood-burning and solar heating systems, and also heat pumps and space-heating systems, including those for systems in automobile construction, including cooling-water pumps.

49. A method of producing a moulding, comprising
(i) melting the polyamide moulding composition of claim 1, and
(ii) conducting a moulding process selected from the group consisting of an injection moulding, an extrusion moulding, and a blow moulding using a melted composition obtained from the step (i),
wherein the moulding is for at least one of conveying and storage of drinking water at elevated temperatures in the region of and above 80° C., including pipe, fitting, domestic device, water heater, rice cooker, steam cooker, steam iron, housing, mixer, tap, filter casing, water meter, water meter component including bearings, propellers, pins, valve, valve component including housing, shut-off ball, slide, cylinder, distributor, cartridge, pump, pump component including turbine wheels, impellors, line or container or constituent or element thereof.

* * * * *